(12) United States Patent
Haase et al.

(10) Patent No.: US 10,402,190 B2
(45) Date of Patent: Sep. 3, 2019

(54) METHOD FOR AUTHORIZED UPDATING OF AN AUTOMATION TECHNOLOGY FIELD DEVICE

(71) Applicant: Endress+Hauser Conducta GmbH+Co. KG, Gerlingen (DE)

(72) Inventors: Björn Haase, Stuttgart (DE); Ralf Schmidt, Kembs (FR); Markus Kilian, Merzhausen (DE); Helmut Kalteis, Marktoberdorf (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 0 days.

(21) Appl. No.: 15/994,229

(22) Filed: May 31, 2018

(65) Prior Publication Data

US 2018/0349127 A1 Dec. 6, 2018

(30) Foreign Application Priority Data

May 31, 2017 (DE) .................. 10 2017 111 928

(51) Int. Cl.
| | |
|---|---|
| *G06F 9/44* | (2018.01) |
| *G06F 8/65* | (2018.01) |
| *H04L 9/32* | (2006.01) |
| *G06F 8/654* | (2018.01) |
| *H04L 9/08* | (2006.01) |
| *G06F 21/44* | (2013.01) |
| *G06F 21/57* | (2013.01) |
| *G06F 8/658* | (2018.01) |

(52) U.S. Cl.
CPC .............. *G06F 8/65* (2013.01); *G06F 8/654* (2018.02); *G06F 21/44* (2013.01); *G06F 21/572* (2013.01); *H04L 9/0891* (2013.01); *H04L 9/3247* (2013.01); *G06F 8/658* (2018.02)

(58) Field of Classification Search
None
See application file for complete search history.

(56) References Cited

U.S. PATENT DOCUMENTS

| | | | |
|---|---|---|---|
| 8,150,039 B2 * | 4/2012 | de Cesare | G06F 21/575 713/171 |
| 2008/0052699 A1 | 2/2008 | Baker et al. | |
| (Continued) | | | |

OTHER PUBLICATIONS

Search Report for German Patent Application No. 10 2017 111 928.0, German Patent Office, dated Feb. 9, 2018, 8 pp.
(Continued)

*Primary Examiner* — Qamrun Nahar
(74) *Attorney, Agent, or Firm* — Mark A. Logan; PatServe

(57) ABSTRACT

The invention relates to a method for authorized updating of first operating software of a field device which is used in an automation technology installation, wherein an authentication test of second operating software for the field device is performed, which second operating software is signed by means of a first private key associated with the installation, wherein, within the scope of the authentication test, the signature, generated by the first private key, of the second operating software is authenticated by means of a first public key associated with the installation, and wherein, in the event that the authentication test has been performed successfully, the first operating software located on the field device is at least partially replaced by the second operating software.

9 Claims, 1 Drawing Sheet

(56) References Cited

U.S. PATENT DOCUMENTS

2014/0040873 A1\* 2/2014 Goldman .................. G06F 8/65
                                                    717/168
2014/0344581 A1\* 11/2014 Grieco ..................... G09C 1/00
                                                    713/176
2017/0090909 A1    3/2017 Guo et al.

OTHER PUBLICATIONS

Wikipedia, Felderät, https://de.wikipedia.org/wiki/Felderät, (last accessed: Feb. 9, 2018) 2 pp.
OBD Solutions, STN Bootloader, Firmware Update Specification for Devices with STN Bootloader, www.obdsol.com, 2011, 12 pp.

\* cited by examiner

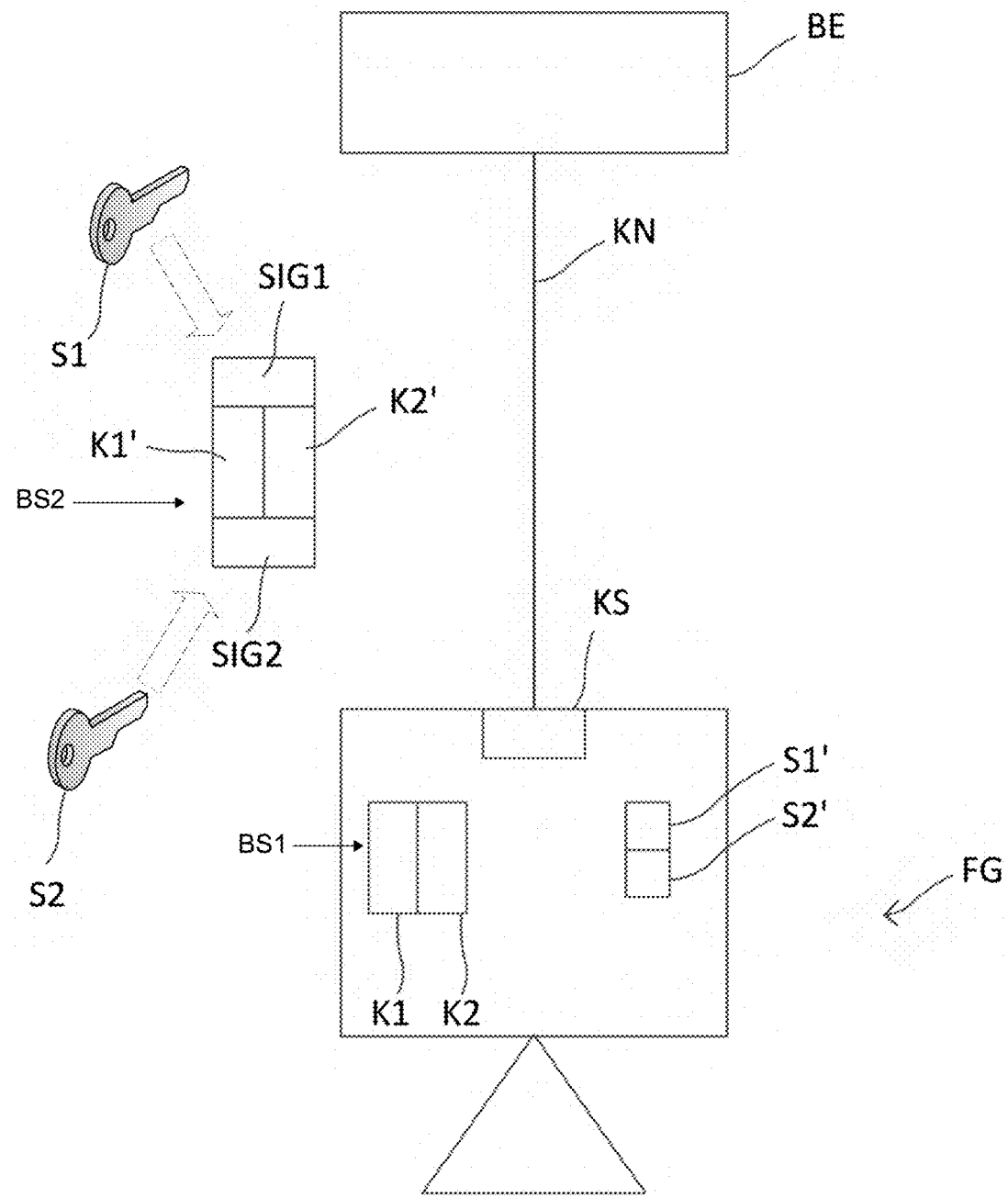

METHOD FOR AUTHORIZED UPDATING OF AN AUTOMATION TECHNOLOGY FIELD DEVICE

CROSS-REFERENCE TO RELATED APPLICATION

The present application is related to and claims the priority benefit of German Patent Application No. 10 2017 111 928.0, filed on May 31, 2017, the entire contents of which are incorporated herein by reference.

TECHNICAL FIELD

The invention relates to a method for authorized updating of a field device which is used in an automation technology installation.

BACKGROUND

Field devices that are used in industrial installations are already known from the prior art. In many cases, field devices are used in automation technology, just as in manufacturing automation. Field devices, in general, refer to all devices which are process-oriented and which process or supply process-relevant information. Field devices are thus used for detecting and/or influencing process variables. Measuring devices, or sensors, are used for detecting process variables. These are used, for example, for pressure and temperature measurement, conductivity measurement, flow measurement, pH measurement, fill-level measurement, etc., and detect the corresponding process variables of pressure, temperature, conductivity, pH value, fill-level, flow, etc. Actuators are used for influencing process variables. These are, for example, pumps or valves that can influence the flow of a fluid in a pipe or the fill-level in a tank. In addition to the measuring devices and actuators, field devices are also understood to include remote I/O's, radio adapters, or, generally, devices that are arranged at the field level.

A variety of such field devices are produced and marketed by the Endress+Hauser group.

In modern industrial plants, field devices are usually connected to superordinate units via communications networks, such as fieldbuses (Profibus®, FOUNDATION® Fieldbus, HART®, etc.). Higher-level units are control units, such as an SPS (storage programmable controller) or a PLC (programmable logic controller). The higher-level units are used for, among other things, process control, as well as for commissioning of the field devices. The measured values detected by the field devices—in particular, by sensors—are transmitted via the respective bus system to a (or possibly several) higher-level unit(s) that further process the measured values, as appropriate, and relay them to the control station of the plant. The control station serves for process visualization, process monitoring, and process control via the superordinate units. In addition, a data transfer is also required from the superordinate unit via the bus system to the field devices—in particular, for configuration and parameterization of field devices, as well as for control of actuators.

At the field device, operating software—more precisely, what is known as firmware—is implemented for executing functions of the field device, e.g., pertaining to its measuring function, but also its human/machine interface (HMI) or its graphical user interface (GUI), as well as its interface to a superordinate unit. To provide new functions and/or to correct errors or security holes, an updated version of the firmware with which the old version of the firmware that is located on the field device should be overwritten is provided by the field device manufacturer at more or less regular time intervals.

In many industrial installations, the installation operator reviews the firmware before installing it, and only then grants a release to update the field devices. A secure operation of the installation is important to the installation operator; at the same time, however, he would like to avoid a change to a measuring operation of his field devices that is typically error-free. At present, it could very well happen that an employee accidentally installs a new version of firmware, although this has not yet been approved for the installation.

There is currently no solution for the problem that the installation operator would, on the one hand, actually like to continue to work with the old version of the firmware in order to leave the measuring function of a field device unchanged, but, on the other hand, requires a newer version of the firmware in order to close security gaps.

Furthermore, the danger exists that an unauthorized individual might transfer potentially harmful firmware to the field device, with the aid of which he may, for example, read out confidential information, e.g., parameter settings, or that he might sabotage the operation of the field device—for example, by deactivating measuring and/or safety functions.

SUMMARY

In light of this problem, the invention is based upon the aim of presenting a method which allows secure updating of operating software to be performed.

According to the invention, the aim is achieved via a method for authorized updating of first operating software—in particular, firmware—of a field device which is used in a process automation installation, wherein an authentication test of second operating software for the field device is performed, which second operating software is signed by means of a first private key associated with the installation, wherein, within the scope of the authentication test, the signature, generated by the first private key, of the second operating software is authenticated by means of a first public key associated with the installation, and wherein, in the event that the authentication test has been performed successfully, the first operating software located on the field device is at least partially replaced by the second operating software.

The great advantage of the method according to the invention is that, without a successful authentication test, a different version of operating software cannot be loaded onto the field device to replace the version of the operating software that is already located on the field device. Operating software which has no signature, or a signature that does not match, cannot replace the version of the operating software that is located on the field device, whereby the method according to the invention allows secure updating of the firmware located on the field device. It is not possible for an unauthorized person to load sabotaged firmware, since he does not possess the first private key with which he might sign his harmful version of the firmware. Possession of the first public key, or knowledge about the first public key, does not enable the first private key to be calculated from this.

In particular, asymmetric methods, e.g., RSA, DSA, etc., or signature methods based upon what are known as Merkle trees, may be considered as cryptographic methods for signing the second operating software or for authentication testing of the signature.

Field devices that are mentioned in connection with the invention have already been described by way of example in the introductory part of the description.

According to a particularly preferred embodiment of the method according to the invention, the second operating software is only signed with the first private key when the second operating software receives a release from an installation operator. In particular, the installation operator checks on test field devices which functions of the field device are modified by overwriting the first operating software located on the field device, and whether the field device, after overwriting with the second operating software, allows an operation identical to that when using the first operating software.

In an advantageous embodiment of the method according to the invention, it is provided that the second operating software be additionally signed—in particular, by the field device manufacturer—by means of a second private key. In this way, use of original operating software of the field device manufacturer is confirmed to the installation operator.

Preferred embodiment of the method according to the invention provides that, within the scope of the authentication test in the field device, the signature generated by the second private key be authenticated by means of a second public key. For an unauthorized person, uploading a sabotaged operating software is immensely difficult, since he must have knowledge of both the first private key and the second private key. To test the signature generated by the field device manufacturer, said manufacturer transmits to the customer a second public key corresponding to the second private key. Possession of the second public key, or knowledge about the second public key, does not enable the second private key to be calculated from this.

According to a first advantageous variant of the method according to the invention, it is provided that the first and second operating software respectively comprise a first component and a second component, wherein, upon replacement of the first operating software by the second operating software, the first component of the first operating software is replaced by the first component of the second operating software.

According to a second advantageous variant of the method according to the invention, it is provided that the first and second operating software respectively comprise a first component and a second component, wherein, upon replacement of the first operating software by the second operating software, the second component of the first operating software is replaced by the second component of the second operating software.

According to a third advantageous variant of the method according to the invention, it is provided that the first and second operating software respectively comprise a first component and a second component, wherein, upon replacement of the first operating software by the second operating software, the first component of the first operating software is replaced by the first component of the second operating software, and the second component of the first operating software is replaced by the second component of the second operating software.

The advantage of all three variants is that, although the first operating software may be completely replaced by the second operating software, this does not constitute an absolute necessity. Rather, portions of the first operating software may be replaced with corresponding portions of the second operating software, so that the non-updated portions remain unchanged.

According to an advantageous embodiment of the method according to the invention, it is provided that only a successful implementation of the authentication testing of the second component of the second operating software be required for replacement of the first operating software by the second operating software. For example, in this way, those functions which merely serve for the display of information—for example, the menu structure in the display of the field device—or to improve security may be updated without requiring authentication, wherein updating critical functions of the field device (for example, with respect to the measuring function or the precise real-time behavior of the measuring function) necessarily requires successful authentication testing of the second operating software.

In an advantageous embodiment of the method according to the invention, it is provided that the first component offer security functions, HMI functions, GUI functions, and/or an interface to a superordinate unit. The term, "security," designates prevention of manipulation of the field device by third parties. It is sought in this manner to protect a field device from being able to be sabotaged by an unauthorized party, or from security functions, for example, being able to be switched off and/or device parameters of the field device to be changed through unauthorized intervention.

What is understood by the term, "HMI" ("Human/Machine Interface"), are operating functions of the field device, for example. What is understood by the term, "GUI" ("Graphical User Interface"), are display elements of the field device—for example, on its display. GUI functions are, for example, the manner of presentation of information on the display of the field device, or its menu structure. The field device may be accessed via the interface to a superordinate unit, or via a communications network.

In an advantageous embodiment of the method according to the invention, it is provided that the second component provide functions which influence the field device with respect to its measuring function—in particular, the time coordination of the measurement value detection.

According to an advantageous development of the method according to the invention, it is provided that the first and second components of the first or second operating software be distributed to separate processing units, e.g., what are known as microcontrollers, of the field device. Upon updating an individual component, only these are overwritten at their associated processing units.

BRIEF DESCRIPTION OF THE DRAWINGS

The invention is explained in greater detail with reference to the following FIGURE. Illustrated is:

FIG. 1: a schematic overview of an exemplary embodiment of the method according to the invention.

DETAILED DESCRIPTION

FIG. 1 shows a schematic overview of an application example of the method according to the invention. A field device FG is shown, which is placed into a measuring station of a process installation. The field device FG is an automation technology field device for detecting a process variable, e.g., the pressure or the flow rate in a conduit. Additional applications of such a field device FG have already been explained in detail in the introductory part of the description.

This field device FG possesses a communications interface KS and is connected via said communications interface KS to a communications network KN. Communications interface KS is, for example, a fieldbus interface integrated into field device FG—for example, in accordance with the Ethernet, HART, Profibus, Modbus, or Foundation Fieldbus standard. In such an instance, the communications network KN is such an automation technology fieldbus. The field device FG is engaged in a communications connection via the communications network KN to additional field devices and a control level having one or more superordinate units. According to the invention, an operator unit BE is engaged in a communications connection to the field device FG. The operator unit BE is, in particular, a component of the control level, e.g., a workstation PC or else a server arranged at a distance from the installation—in particular, a cloud-enabled server—that is connected via the internet to one or more components of the installation—for example, even directly to field device FG.

Alternatively, the communications interface KS is designed as a service interface (for example, as a wireless or wired CDI interface, which many of the field devices produced and marketed by the applicant have) which is designed to establish an additional communications network, independent of the fieldbus, for connection to the operator unit BE. In such a case, an operator unit BE is, in particular, a mobile operator unit, e.g., the "Field Xpert" produced and marketed by the applicant, or a mobile terminal device such as a smartphone or a tablet. This type of operator unit BE may also be connected to the fieldbus and communicate via this with the field device FG.

First operating software BS1 is implemented in the field device FG. This first operating software BS1 consists of a first component K1 and a second component K2. The first component K1, in particular, provides security functions, HMI functions, and/or GUI functions, whereas the second component K2, in particular, provides functions which affect the field device FG with respect to its measuring function—in particular, the time coordination of the measurement value detection.

After development and sale of a field device type, this receives regular updates of its firmware, and thus of the first operating software BS1. In particular, security gaps that are discovered must be closed promptly, which is why updates which pertain to the first, "fast-moving" component K1 of the first operating software are published more often than updates to the second, "long-lasting" component K2 of the first operating software BS1.

To update the first operating software BS1, second, more current operating software BS2 is loaded from the operator unit BE to the field device via the communications network KN. This has been sufficiently tested and approved by the installation operator. In the course of the approval, a signature SIG 1 has been added to the second operating software. This signature SIG1 was calculated with the aid of a first private key S1. The contents of the first private key S1 are thereby known only to the installation operator.

After receipt of the second operating software BS2, the field device FG tests this for authenticity. For this, a first public key S1' which corresponds to the first private key S1 is used, which first public key S1' is stored in the field device FG. Only if the authenticity has been successfully confirmed does the field device FG accept the second operating software BS2 and overwrite its already present operating software BS1 with this.

In the event that the authenticity of the second operating software BS2 should not be successfully confirmed, the first operating software BS1 present on the field device is not overwritten with the second operating software BS2. It is thereby impossible for an unauthorized party to sabotage the field device FG by means of an unauthorized version of firmware. Moreover, it is also not possible to accidentally use a version of the firmware that has not yet been approved by the installation operator for updating. Furthermore, it may also be provided that the field device manufacturer, which is the creator of the second operating software BS2, provide this second operating software BS2 with its own signature SIG2 created by means of a second private key S2. In this instance, the field device checks both signatures SIG1, SIG2 and uses a second public key S2' to test the authenticity, which second public key S2' corresponds to the second private key S2. Only if the authenticity has been successfully checked in both instances does an update of the field device firmware take place by means of the second operating software.

Upon updating the first operating software BS1, both components K1, K2 do not necessarily need to be updated. Depending upon the application, it may be provided for only the first component K1 or only the second component K2 to be updated. Furthermore, it may be provided that only the second component K2' of the second operating software BS2 be signed. Only a successful implementation of the authentication testing of the second component K2' of the second operating software BS2 is thereby required. For example, in this way, those functions which merely serve for the display of information—for example, the menu structure in the display of the field device—or to improve security may be updated without requiring authentication, wherein updating critical functions of the field device FG necessarily requires successful authentication testing of the second component K2' of the second operating software BS2.

In an advantageous embodiment, the field device FG possesses in its internal structure two or more processing units (for example, in the form of microcontrollers); the components K1 and K2 are executed on different processing units. This procedure allows the components K1 and K2 to be modified independently of one another and to be used successfully in various pairings in a simple manner. Alternatively, it is possible to execute the components K1 and K2 on a single processing unit and to consolidate these via a software interface, such as a dynamic library interface (DLL) or even the use of what is known as a virtual machine, so that the components K1 and K2 may be jointly operated together in different versions.

For practical realization, for storage and transmission of software components, the method advantageously uses what is known as a container data format, as, for example, standardized via the Extended Markup Language (XML) or via the Distinguished Encoding Rules (DER) for security certificates that are used within the scope of the X509 standard, which are used on the internet. Meta-information, e.g., digital signatures, may also be stored as well in such a container format, in addition to the source code of the software. At the same time, in such container data formats, it is also possible to bundle various software sub-components K1, K2 into a common file and to associate these with common or separate meta-information such as digital signature fields.

Upon startup in the installation, the public key (first public key S1') of the installation is transmitted to the field device FG, wherein the field device FG is configured such that, in the event of a software update, this may only accept software which contains as meta-information a valid signature field stored in the transmitted container data file, which signature field was generated with the first private key.

The configuration of the field device FG may thereby advantageously take place such that the additional signature SIG1 with the first private key S1 that was done for the installation within the scope of the approval process is enforced only for those software portions that include a direct effect on the measuring function. Security patches may thus be input rapidly, even should an official approval process at the installation operator not have yet been performed.

The approval process, for the installation operator, for new software of the field device FG would then proceed such that, first, testing of the functional capability (measurement performance, time response, compatibility with drivers at the control center, etc.) would take place. After a positive testing has taken place, additional meta-information would be supplemented by the installation operator with the signature SIG1, SIG2 of the positively tested firmware in a container file of the firmware of the field device manufacturer. This signature SIG1, SIG2 that is the additionally contained in the data file would be calculated with the aid of the first private key S1 that is kept confidential by the installation operator.

This supplemented file may then be transmitted to the field device FG in the course of the updating process. Due to its configuration that has taken place, the field device FG then seeks a valid signature field of the installation operator, for example, and tests this with the transmitted first public key S1' (transmitted from the installation operator upon device startup).

Furthermore, the field device optionally or alternatively checks for the presence of a second signature field (generated by the field device manufacturer) using the likewise known second public key S2' of the field device manufacturer (which, for example, was already transmitted within the scope of the production process of the device manufacturer).

Depending upon the configuration of the field device FG, different authentication requirements are, advantageously, set for the function-defining and security-defining software sub-components K1 and K2. For example, security patches in the first component K1 might be accepted solely on the basis of valid signatures SIG1 of the field device manufacturer (generated/tested with second private/public keys S2, S2'), whereas the signature of the installation operator (generated/tested with first private/public keys S1, S1') would additionally be mandatory for the measurement function (second component K2). In an advantageous embodiment, the signature testing would be outsourced to a separate hardware module (what is known as a smart card chipset). These chips, available as hard-soldered or also as pluggable modules, allow an especially secure realization via so-called side channel protection, and, especially, via secure cryptography hardware accelerators.

In the case of an insertable smart card chipset, the initial parameterization of a field device FG by the installation operator might take place by a smart card preconfigured by the installation operator being inserted into an associated socket of the field device FG, similar to how so-called "SIM" cards are implemented with mobile telephones.

The invention claimed is:

1. A method for an authorized updating of a first operating software of a field device used in an automation technology installation, comprising:
   signing a second operating software for the field device using a first private key associated with the installation;
   executing an authentication test of the second operating software, wherein the authentication test includes authenticating a signature of the second operating software generated by the first private key using a first public key associated with the installation, and
   upon a successful authentication test, at least partially replacing the first operating software located on the field device by the second operating software,
   wherein the first operating software and the second operating software each comprise a first component and a second component,
   wherein the second component of the first operating software and the second component of the second operating software each include functions which influence the field device with respect to its measuring function including a time coordination of a measurement value detection, and
   wherein the at least partial replacing of the first operating software by the second operating software includes replacing the first component of the first operating software with the first component of the second operating software.

2. The method according to claim 1, further comprising:
   signing the second operating software using the first private key only when the second operating software receives an approval from an installation operator.

3. The method according to claim 1, further comprising:
   signing the second operating software by the field device manufacturer using a second private key.

4. The method according to claim 3, wherein the authentication test includes authenticating a signature generated by the second private key using a second public key.

5. The method according to claim 1, wherein the first operating software and the second operating software each comprise a first component and a second component, wherein the at least partial replacing of the first operating software by the second operating software includes replacing the second component of the first operating software with the second component of the second operating software.

6. The method according to claim 1, wherein the first operating software and the second operating software each comprise a first component and a second component, wherein the at least partial replacing of the first operating software by the second operating software includes replacing the first component of the first operating software with the first component of the second operating software and replacing the second component of the first operating software with the second component of the second operating software.

7. The method according to claim 6, wherein only the second component of the second operating software is signed, and wherein the authentication test includes authenticating only the signature of the second component of the second operating software.

8. The method according to claim 1, wherein the first component of the first operating software and the first component of the second operating software each include security functions, HMI functions, GUI functions, and/or an interface to a superordinate unit.

9. The method according to claim 1, wherein the first component and the second component of the first operating software or the second operating software are distributed to separate processing units of the field device.

* * * * *